Patented June 21, 1932

1,863,599

UNITED STATES PATENT OFFICE

LESLIE G. JENNESS, OF BROOKLYN, NEW YORK, ASSIGNOR TO INTERMETAL CORPORATION, OF NEW YORK, N. Y., A CORPORATION OF DELAWARE

RECOVERY OF METALS FROM THEIR ORES

No Drawing.   Application filed December 20, 1929.   Serial No. 415,622.

In my copending application Serial No. 364,340 filed May 18, 1929, I have described and claimed a general method of selectively reducing and volatilizing various metals contained in an ore and thus separately recovering each metal as a chloride. The method there described and claimed comprises the steps of selective reduction and simultaneous chlorination and volatilization in the presence of sulphur chlorides and chlorine at regulated temperatures. By this method each metal in an ore is separately recovered as a chloride at a given predetermined temperature which is distinct from the temperature at which each other metal is recovered.

I have also, in my copending application Serial No. 384,809 filed August 9, 1929, described a modification of the process above mentioned which is especially adapted for the treatment of certain ores. It is pointed out in this latter copending application, that if certain ores are given an ignition treatment previously to their treatment with sulphur chlorides and chlorine, the metallic constituents of the ore are rendered more resistant to volatilization under treatment by the sulphur chlorides and chlorine. The ignition treatment, moreover, causes a spread between the reduction and volatilization temperatures of the metallic constituents wider than is found in the natural unignited ore.

It is an object of the present invention to provide a process which avails itself of an ignition treatment similar to that of my said copending application, Serial No. 384,809, and a subsequent reduction and chlorination similar to that described and claimed in my said copending application, Serial No. 364,340, with this difference, however, that, instead of volatilizing the metallic compounds and separately recovering them in the manner shown in said copending applications, the process of the present invention proceeds after reduction and chlorination at temperatures too low to volatilize any substantial amount of the chlorides so formed. It is a further object to obtain by the method herein described and claimed compounds of various metals that are soluble in aqueous solutions and which can accordingly be obtained from the ore so treated by leaching methods.

I have discovered that in the case of many ores, there is another very great and curious difference between the response of ignited ores to the action of sulphur chlorides and chlorine and the response of these ores when not ignited. In some cases ignition seems to effect an actual reversal between the starting points of distillation of two given metals. I have found for example that, when wolframite is ignited at a temperature of approximately 700° C. for a period of two to three hours both the tungsten and iron in the ore are made more refractory to subsequent volatilization by sulphur chlorides and chlorine, but that the volatilization is repressed more in the case of tungsten than of iron. The ore, furthermore, increases in weight on ignition.

I will illustrate the process by describing its application to one ore, namely, wolframite, although the process is not limited to that ore only.

The ore is first ground. It is not, however, essential that the particles should be very fine as the present process gives excellent results with ore ground as coarse as about 100 mesh. This ore is then ignited in a furnace for from two to three hours at about 700° C.

It should here be pointed out that this ignition is not essential to the success of the present process. It seems, however, to cause a cracked or porous condition of the ore particles, thus providing more surface on which the gases may act. But whether this explanation be the correct one or not, I have found that with ore previously ignited in this manner, half as much more soluble tungsten compounds can be obtained than in the case of unignited ore. I have also found, as hereinabove pointed out that the ignition seems to impart a greater resistance to volatilization under the sulphur chloride and chlorine treatment.

After this ignition treatment, sulphur chlorides and chlorine are passed over the ore while a temperature of about 200° C. is maintained in the furnace. As very little volatilization of the tungsten occurs until a temperature of over 200° C. is attained, substantially all the tungsten remains in the ore in a reduced and chloridized form.

At this temperature, indeed, both iron and tungsten are thus reduced and remain in the residue. I have also discovered that between 180° C. and 200° C., a compound of tungsten is formed which is soluble in aqueous solutions but which is readily volatilized at temperatures in the neighborhood of 230° C. and higher. I consider it of advantage, therefore, in the present process to maintain the temperature at about 200° C. or below during the sulphur chloride and chlorine treatment because volatilization, which is not desirable in the present process, becomes appreciable at about 205° C.

At 200° C. substantially all the tungsten is easily converted to the soluble form. Some small portion of the tungsten is, indeed, volatilized, but this can be condensed by maintaining a lower temperature in the exit end of the furnace. It will then pass out with the remainder of the ore and be recovered by leaching as hereinafter described.

It will be observed that the process of this invention aims at the production of soluble compounds of the metals, by utilizing sulphur chlorides and chlorine at temperatures below the points of rapid volatilization of their chlorides. It is probable that some of these resulting soluble compounds are chlorides other than the normal chlorides, and, indeed, they seem to be such.

I have produced soluble compounds of vanadium and titanium by treating the ignited ores with sulphur chlorides and chlorine.

When ore has thus been reduced and chlorinated, it may be easily recovered by leaching. Sodium carbonate may be used as a leach forming a sodium tungstate solution, the iron remaining insoluble. From this solution tungstic acid is precipitated by adding it to hot hydrochloric acid solution. When this tungstic acid is heated at 700° C. a very high grade tungstic oxide is obtained.

I prefer, however, not to leach with sodium carbonate because of the very great difficulty of removing the alkali from the product obtained. By using ammonium hydrate ($NH_4OH$) as a leach, ammonium tungstate is taken up in solution. Iron and other constituents are left in the gangue. By evaporation, a paratungstate is crystallized out and a very pure tungstic oxide is obtained either by heating or by treating with nitric and hydrochloric acids followed by ignition.

The advantage of the ammonia leach over the sodium carbonate will be easily appreciated from the resulting product. In practically all present methods of production of tungstic acid, an alkali metal must come into contact with the tungsten. Where sodium and tungsten materials, for instance, come into contact with each other it is very difficult, if not impossible, to remove the sodium by any amount of washing. The presence of a few hundredths of a per cent of sodium in tungstic acid is detrimental to the production of tungsten metal. Calcium and magnesium are similarly harmful. By leaching with ammonia, however, all alkali metals are avoided.

The process of the present patent, indeed, affords a convenient method of decomposing iron tungstate without effect upon the remainder of the gangue. It also renders tungsten soluble in alkaline solutions and by converting the tungsten to a readily soluble condition, makes it possible to use ammonia solutions for the leach so that no alkali metals need come in contact with the tungsten. Finally an exceedingly pure grade of tungstic acid can be prepared by a single leach and precipitation.

What I claim is:—

1. The process of recovering tungsten from the ore which consists in igniting the finely divided ore at a temperature of about 700° C., treating said ignited ore with sulphur chlorides and chlorine at about 200° C., and then leaching the ore so treated.

2. The process of recovering tungsten from the ore which consists in igniting the finely divided ore at a temperature of about 700° C., treating said ignited ore with sulphur chlorides and chlorine at about 200° C., and then leaching the ore so treated with ammonium hydroxide.

3. The process of recovering tungsten from the ore which consists in igniting the finely divided ore at a temperature of about 700° C., treating said ignited ore with sulphur chlorides and chlorine at about 200° C., and then leaching the ore so treated with a leach free from alkali metal compounds.

4. The process of recovering tungsten from the ore which comprises treating the ore with sulphur chlorides and chlorine at a temperature below the rapid volatilization temperature 230° C. of the thus formed chloridized tungsten product; and then suitably leaching said product out of said ore.

5. The process of recovering tungsten from the ore which comprises treating the ore with sulphur chlorides and chlorine at a temperature below the rapid volatilization temperature 230° C. of the chloridized tungsten product; and then leaching the ore so treated with ammonium hydroxide.

In testimony whereof, I have hereunto set my hand this 18th day of December, 1929.

LESLIE G. JENNESS.